US012231516B2

(12) United States Patent
König

(10) Patent No.: US 12,231,516 B2
(45) Date of Patent: Feb. 18, 2025

(54) DATA ACQUISITION DEVICE FOR MOBILE DEVICES, METHOD FOR CONDUCTING A PRELIMINARY ANALYSIS IN A DATA ACQUISITION DEVICE, A VEHICLE, AND COMPUTER PROGRAM CONFIGURED ACCORDINGLY

(71) Applicant: ZF CV Systems Global GmbH, Bern (CH)

(72) Inventor: Christoph König, Hannover (DE)

(73) Assignee: ZF CV Systems Global GmbH, Bern (CH)

( * ) Notice: Subject to any disclaimer, the term of this patent is extended or adjusted under 35 U.S.C. 154(b) by 274 days.

(21) Appl. No.: 17/935,715

(22) Filed: Sep. 27, 2022

(65) Prior Publication Data

US 2023/0013950 A1    Jan. 19, 2023

Related U.S. Application Data

(63) Continuation of application No. PCT/EP2021/057196, filed on Mar. 22, 2021.

(30) Foreign Application Priority Data

Mar. 27, 2020    (DE) .................... 10 2020 108 581.8

(51) Int. Cl.
*H04L 67/5651* (2022.01)
*H04L 12/40* (2006.01)

(52) U.S. Cl.
CPC .......... *H04L 67/5651* (2022.05); *H04L 12/40* (2013.01); *H04L 2012/40215* (2013.01); *H04L 2012/40273* (2013.01)

(58) Field of Classification Search
None
See application file for complete search history.

(56) References Cited

U.S. PATENT DOCUMENTS 10,358,116 B1    7/2019    Jayaraman et al.
10,917,365 B1 *  2/2021    Reddy .................. H04L 51/234
(Continued)

FOREIGN PATENT DOCUMENTS

CN    101278325 A    10/2008
CN    104883382 A    9/2015
(Continued)

OTHER PUBLICATIONS

Written Opinion of the International Searching Authority dated Jun. 1, 2021 for international application PCT/EP2021/057196 on which this application is based.
(Continued)

*Primary Examiner* — Angela Nguyen
(74) *Attorney, Agent, or Firm* — Walter Ottesen, P.A.

(57) ABSTRACT

The disclosure relates to a data acquisition device for mobile devices, having a processing unit and a memory unit. The data acquisition unit includes a communications module for transmitting acquired data to a backend server, and a bus interface for receiving messages transmitted via an internal communications bus of the mobile device. The processing unit is configured to use the data received in the messages to form a data series, and to store the data series in the memory unit. In order to reduce the memory required, the processing unit is configured to conduct a preliminary analysis of the stored data series to extract at least one region of interest of the data series and transfer the same to the communications module, which is configured to transmit the at least one extracted region of the data series to the backend server. This procedure is equivalent to data aggregation.

18 Claims, 6 Drawing Sheets

(56) References Cited

U.S. PATENT DOCUMENTS

| | | |
|---|---|---|
| 2005/0065711 A1 | 3/2005 | Dahlgren et al. |
| 2007/0248029 A1* | 10/2007 | Merkey ................ H04L 67/561 |
| | | 370/255 |
| 2012/0053778 A1 | 3/2012 | Colvin et al. |
| 2014/0016463 A1* | 1/2014 | Kitada ................... H04L 47/20 |
| | | 370/230.1 |
| 2015/0244805 A1 | 8/2015 | Hampiholi et al. |
| 2016/0371010 A1 | 12/2016 | Kramer et al. |
| 2017/0088104 A1 | 3/2017 | Risse et al. |
| 2018/0227197 A1 | 8/2018 | Rall et al. |

FOREIGN PATENT DOCUMENTS

| | | |
|---|---|---|
| CN | 106257431 A | 12/2016 |
| CN | 110191434 A | 8/2019 |
| DE | 10 2008 015 352 A1 | 9/2009 |
| DE | 10 2008 047 727 A1 | 3/2010 |
| DE | 10 2014 004 182 A1 | 9/2015 |
| DE | 10 2017 201 804 A1 | 8/2018 |
| DE | 10 2017 206 073 A1 | 10/2018 |

OTHER PUBLICATIONS

International Search Report of the European Patent Office dated Jun. 1, 2021 for international application PCT/EP2021/057196 on which this application is based.

* cited by examiner

# DATA ACQUISITION DEVICE FOR MOBILE DEVICES, METHOD FOR CONDUCTING A PRELIMINARY ANALYSIS IN A DATA ACQUISITION DEVICE, A VEHICLE, AND COMPUTER PROGRAM CONFIGURED ACCORDINGLY

CROSS REFERENCE TO RELATED APPLICATIONS

This application is a continuation application of international patent application PCT/EP2021/057196, filed Mar. 22, 2021, designating the United States and claiming priority from German application 10 2020 108 581.8, filed Mar. 27, 2020, and the entire content of both applications is incorporated herein by reference.

TECHNICAL FIELD

The disclosure relates to the technical field of systems for data acquisition during the testing and/or operation of mobile devices, in particular for vehicles. For example, it concerns testing a certain behavior of a closed-loop control system of the mobile device and/or observing the ongoing operation of the system for optimizations. In order to be able to acquire the closed-loop control behavior, data series are compiled and also general instructions on how to form an assessment value from a data series. Examples of traditional functions are average value, minimum/maximum, number of elements, or sum of the elements. Statistical evaluation techniques can also be used in order to obtain assessment values. Examples of such assessment values are: mode, median, arithmetic mean, standard deviation, upper and lower quantile, et cetera. In the standard approach to data acquisition, as far as possible all accruing data is acquired, stored and transmitted to a backend server, where it is then analyzed.

BACKGROUND

US 2018/0227197 discloses a method for acquiring data from a vehicle, which method is used to acquire sensor data on an event-driven basis and to store the sensor data in a memory.

US 20121053778 A1 discloses a method and device for remote vehicle diagnosis. Anomalous events are detected, and data is stored before and after the event in a dataset, which is transmitted to an external location. The analysis of the data takes place there. Repairs at a garage can then be scheduled.

DE 10 2008 047 727 A1 discloses a data recorder for recording critical driving situations which records the measurement data from a sensor system if a critical driving situation is identified.

DE 10 2008 015 352 A1 discloses a computer program which causes the recording of the bus traffic interchange over the vehicle data bus, and when a trigger event occurs, stops the overwriting of the ring buffer in order to transfer the contents into a nonvolatile memory.

The known solutions have various disadvantages. This situation was recognized as part of the disclosure. In today's known data acquisition systems for testing various systems of mobile devices, in particular vehicles, there is the problem that these systems record and store the entire data traffic on an internal communications bus, and, if applicable, transmit same to an external processing unit, where the data evaluation is then carried out. This is a large amount of effort for data storage, data transmission and data evaluation.

Thus there is a need for further improvements in data acquisition systems.

SUMMARY

It is an object of the disclosure to disclose an improved data acquisition system. This object can, for example, be achieved by a data acquisition device for a mobile device. The data acquisition device includes: a processing unit; a memory unit; a communications module configured to send acquired data to a backend server; a bus interface configured to receive messages (CANB) transmitted via an internal communications bus of the mobile device; the processing unit being configured to form a data series (DR) on a basis of data received in the messages (CANB) and to store the data series (DR) in the memory unit; the processing unit being configured to conduct, in the form of data aggregation, a preliminary analysis of the data series (DR) stored in the memory unit, wherein at least one region of interest (KBDB) of the data series (DR) is extracted and transferred to the communications module in the preliminary analysis; and, the communications module being configured to transmit the at least one region of interest (KBDB) of the data series (DR) to the backend server.

It is a further object of the disclosure to provide a method for conducting a preliminary analysis in a data acquisition device. This object can for example be achieved via a method for conducting a preliminary analysis in a data acquisition device having a processing unit, a memory unit, a communications module configured to send acquired data to a backend server, and, a bus interface configured to receive messages (CANB) transmitted via an internal communications bus of the mobile device. The method includes: forming, via the processing unit, a data series DR on a basis of data received in in the messages (CANB) and storing the data series (DR) in the memory unit; conducting, via the processing unit, in a form of data aggregation, a preliminary analysis of the data series (DR) stored in the memory unit, wherein at least one region of interest (KBDB) of the data series (DR) is extracted and transferred to the communications module in the preliminary analysis; transmitting the at least one region of interest (KBDB) of the data series (DR) to the backend server via the communications module; and, wherein the preliminary analysis fulfils the function of the data aggregation.

In a first aspect, the disclosure relates to a data acquisition device for mobile devices. This data acquisition device is equipped with a processing unit and a memory unit. It also includes a communications module, which is configured to transmit acquired data to a backend server. In addition, there is a bus interface, which is used to receive messages transmitted via an internal communications bus of the mobile device. The processing unit is configured to use the data received in the messages to form a data series, and to store the data series in the memory unit. A special feature is that the processing unit is configured to conduct a preliminary analysis of the stored data series in order to extract at least one region of interest of the data series and to transfer same to the communications module, which is configured to transmit the at least one extracted region of the data series to the backend server. This procedure is equivalent to data aggregation. If a plurality of regions are of interest, these are grouped together and transmitted. The regions that are not of interest are not transmitted. This form of the improved data acquisition device has the advantage that far less data has to be transmitted via the wireless interface to the backend server. At the same time, it reduces considerably the memory required by the backend server and likewise also reduces the amount of data analysis effort by the backend server. The example of testing a braking system makes this advantage particularly clear. The braking process is short compared with the overall test drive. The data transmission effort can be reduced by more than 90% if just the data of interest is selected by preliminary analysis and transmitted. The memory required and the analysis effort by the backend server are reduced accordingly.

It is advantageous that the acquired data series are stored in the form of time series. If the measurement time points are not transmitted via the internal communications bus, it is advantageous if the processing means is configured to note down in the data series, with the data in each received message, the time point at which each of the received messages is received. By noting down the times, the chronological order of the data is documented, and it is always possible to establish the relation to the various test phases.

In an extended embodiment of the disclosure, it is advantageous if the communications module is configured to receive at least one configuration message, wherein the at least one configuration message contains an instruction as to how the data in a message transmitted via the internal communications bus is meant to be evaluated. This is important if, in the data acquisition means, it is not stored for all the messages to be received, how the data is formatted in the messages. The messages may contain integers, floating-point numbers, et cetera, and the configuration message can enable the data acquisition device to convert the data into the format needed for analyzing the data.

In this regard, it is advantageous if the processing means is configured to compile the data series using the data from the received messages in accordance with the instruction in the at least one configuration message. For example, the actual measured value in a measurement unit can be recovered as a floating-point number by applying the instruction "multiply the received integer by a scaling factor and add an offset".

A typical usage case in which the data acquisition device can be employed advantageously is the case in which the acquired data corresponds to measured data from sensors or relates to data calculated by processing units. The calculated data may be derived from measured data.

Such data acquisition devices can be employed highly advantageously for testing vehicle systems. In this case, the mobile device then corresponds to a vehicle, and the internal communications bus can correspond to, for example, a CAN bus of the vehicle, equivalent to a Controller Area Network. Nowadays, however, many other different bus systems are employed to which data acquisition devices can also be connected. Further examples of what can be employed instead of the CAN bus or the CAN bus line of the vehicle are: Flexray bus, LIN bus (Local Interconnect Network), Ethernet bus, automotive Ethernet, MOST bus (Media Oriented Systems Transport), et cetera.

In one example, the vehicle may correspond to a towing vehicle or a trailer vehicle, and the trailer vehicle may be equipped with a compressed air braking system. The braking system of the trailer vehicle or of the towing vehicle is then tested using the data acquisition device according to the disclosure.

For testing the braking system of the trailer vehicle, it is advantageous to connect the data acquisition device to the internal CAN bus of the trailer vehicle, to which bus is connected a brake control unit, which transmits via the CAN bus or the CAN bus line, the data from a number of brake pressure sensors and/or wheel speed sensors connected to the brake control unit. The data acquisition device then records the data from the brake pressure sensors and/or wheel speed sensors.

For the test and/or the condition assessment of the braking system, it is advantageous if the at least one configuration message, which is sent to the data acquisition device, contains at least the message identifier of the CAN message used to transmit the measured brake pressure from a brake pressure sensor, and a figure for the minimum relative change in brake pressure which, compared with the immediately preceding measured value of the brake pressure, can still be tolerated for it still to be possible to assign the measured value to a region of relatively constant brake pressure. The test of the brake system contains the question of what is the deceleration for a constant brake pressure. Therefore, the configuration message is configured to select the regions of interest for this question.

In this regard, it is likewise advantageous if the instruction in the at least one configuration message contains at least the message identifier of the CAN message used to transmit the measured wheel speed from a wheel speed sensor. Hence it is then possible to exclude regions in which the brake is actuated while the vehicle is stationary.

In a second aspect, the disclosure relates to a method for conducting a preliminary analysis in a data acquisition device according to the disclosure. In this regard, it is advantageous that the preliminary analysis contains a step of data aggregation. It is thereby possible to restrict the entire dataset to certain regions of interest.

In this regard, it is advantageous if the step of data aggregation contains a step of calculating the relative change in the data in the data series.

It is also advantageous if, for the purpose of data aggregation, a step is performed of assigning a label to a datum in the data series, in which step the label is assigned to the particular datum if the relative change in the datum compared with the preceding value is less than a minimum permitted reference value. A region of interest can hence be found more quickly in the large dataset.

Finally, it is advantageous if the preliminary analysis contains a step of counting the immediately successive labeled data in the data series, for which data the mobile device is simultaneously still in motion. Hence, in one example, the region of longest duration can be determined during which a system to be tested is actuated by a relatively constant setpoint value.

In one variant, the region of interest can be determined by a step of determining in the data series the region that contains the maximum number of immediately successive labeled data.

Finally, it is advantageous to send to a backend server the region of the data series containing the maximum number of immediately successive labeled data. The archiving of the data and the subsequent analysis can then take place there.

In a third aspect, the disclosure relates to a vehicle that is equipped with a data acquisition device according to the disclosure. Such data acquisition devices can thus also be used as standard for monitoring the operation of the vehicle.

The disclosure also relates to a computer program, which is configured to perform the steps of the method according to the disclosure when executed in a processor.

BRIEF DESCRIPTION OF THE DRAWINGS

The invention will now be described with reference to the drawings wherein.

DESCRIPTION OF THE PREFERRED EMBODIMENTS

The present description illustrates the principles of the disclosure according to the disclosure. It is understood that this will enable a person skilled in the art to configure various arrangements which, while not described explicitly here, do embody principles of the disclosure according to the disclosure, the scope of which is likewise intended to be protected.

Figure 1:
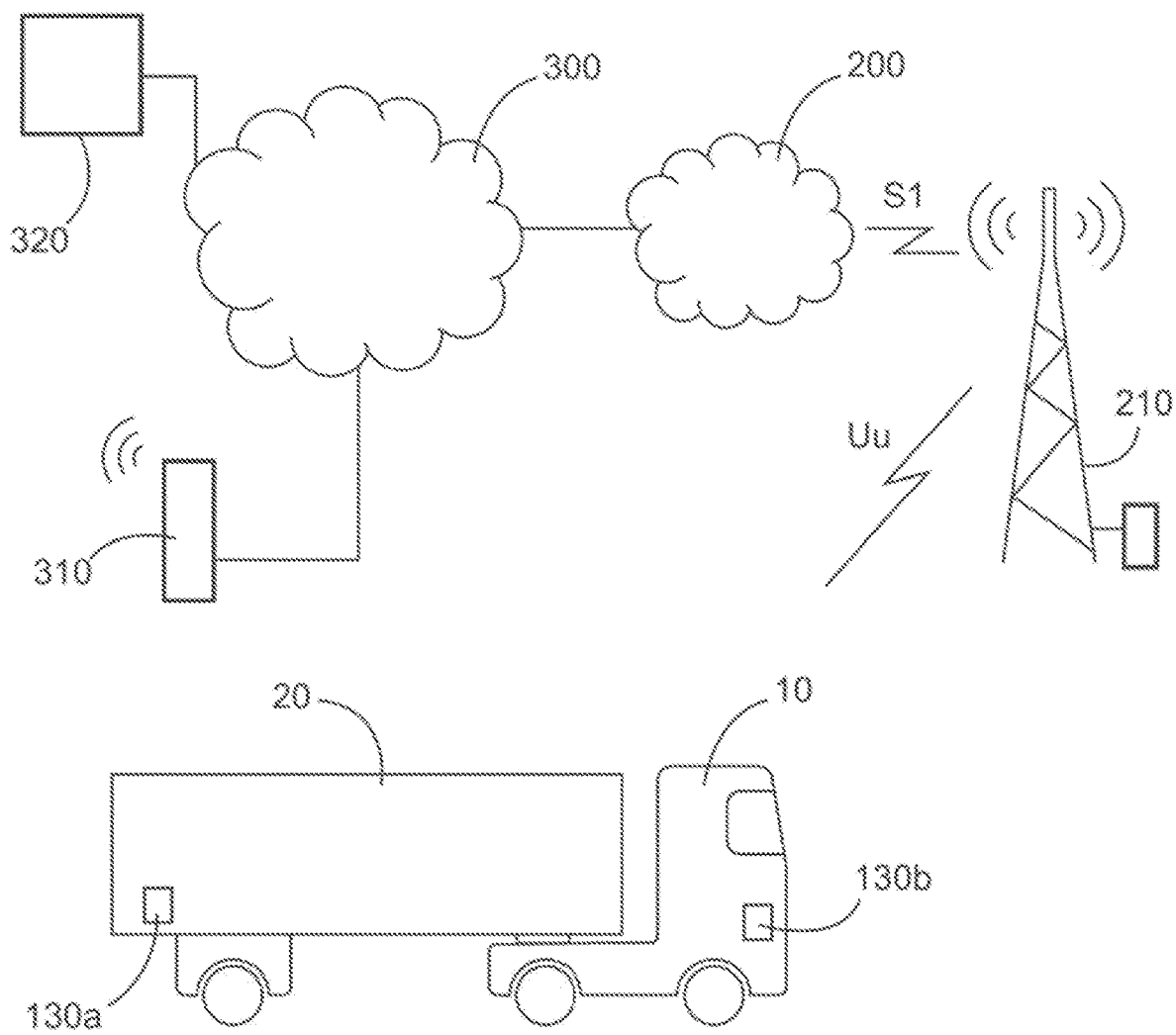
FIG. 1 shows the principle of radio communication between a vehicle and a backend server via a public access mobile communications system.

FIG. 1 shows a block diagram for the transmission of measured-value series that were measured during test drives on a test track. It shows a utility vehicle. Reference number 10 denotes the towing vehicle of a truck. The towing vehicle 10 is towing a trailer vehicle 20. Both towing vehicle 10 and trailer vehicle 20 are equipped with a data acquisition unit 130a, 130b. These data acquisition units 130a, 130b are used to store in measured-value series the measured values provided by sensors. It is equally possible for general data series to be stored, in which case the data is calculated by processing units, if applicable from measured values. The data acquisition unit 130a, 130b can also be used to perform preprocessing of the data series. It can also be equipped with a communications module 136, which is configured to perform wireless communication. The communication can be performed either via a public cellular mobile radio network such as LTE (Long-Term Evolution) or 5G, or via an ad hoc wireless network configured for communication to and from the vehicle. One example is the WLAN p communication system, which is specified in the standard IEEE 802.11 p. The (preprocessed) data can be transmitted via the communications module 136 to a backend server 320, in which the analysis of the data series also takes place.

An approach for an extended type of data aggregation is described below. The aim is to identify and extract a region of interest from a measurement series. In addition to defining the messages and trigger condition, it is possible to configure dynamically via a mobile radio link the instruction for aggregation on the unit in the vehicle.

A specific usage case is to determine the longest constant pressure characteristic during a braking process in order to obtain precise information about the deceleration of the vehicle in this region. Thus there is a variable (pressure characteristic) which, to be deemed constant, is allowed to vary in a certain range, and defines the time period for extracting a second variable (wheel speed). (As a variant, the focus could also be on determining the longest linear region of a variable).

FIG. 1 also shows in this connection the system architecture for vehicle communication via cellular mobile radio. FIG. 1 shows a utility vehicle by way of example. Any other vehicles could also be considered as the vehicle, however. Examples of further vehicles are: automobiles, buses, agricultural machinery, construction machinery, camping vehicles, motorcycles, bicycles, scooters, wheelchairs, rail vehicles, et cetera. The use of the disclosure in vehicles would be generally applicable to land vehicles, rail vehicles, watercraft and aircraft. In addition, the use of the disclosure is not restricted just to vehicles. The disclosure is suitable generally for use practically in all fields of electrical engineering. Further examples are machinery and equipment, small electrical appliances, consumer electronics devices, white goods appliances, medical apparatuses, et cetera. The list is not meant to be exhaustive. In an increasing number of sectors, it is becoming established to connect equipment to the "Cloud". This is commonly known by the term "Internet of Things" (IoT), which represents a trend in technology for more and more equipment in industry, trade and the home to be connected to the Internet using modern communications technology such as 5G, LAN or WLAN. The acquired data series correspond to time series. This means that the measurement time point at which each measured value is acquired is also noted down. In the case of a measurement series in which only one measured variable is acquired, the measurement series consists of a number of successive measured values with the associated measurement time points.

The vehicles 10 and 20 are each equipped with a data acquisition unit 130a, 130b. In one example, the braking system of the trailer vehicle 20 is meant to be tested. The brake pressure is determined by the braking system in the trailer vehicle 20 itself, although the required deceleration of the vehicle is set by the test driver who presses the brake pedal during the braking process. The first data acquisition unit 130a can acquire the braking command as well, because the braking command is transmitted via a communications bus from the towing vehicle 10 to the trailer vehicle 20. If the braking system of the towing vehicle 10 is meant to be tested, a second data acquisition unit 130b of exactly the same configuration as the first data acquisition unit 130a can be connected for this purpose in the towing vehicle 10.

Alternatively, it is also possible for just one second data acquisition unit 130b in the towing vehicle 10 to be used, for instance if the trailer vehicle 20 does not have a data acquisition unit 130a or there is no trailer vehicle 20 coupled to the towing vehicle 10. The description of the technical configuration and functionality of the first data acquisition unit 130a selected here by way of example shall accordingly be understood to be a general description of a data acquisition unit according to the disclosure, and thus can also be applied to the second data acquisition unit 130b and can be implied for this unit.

The first and second data acquisition units 130a, 130b preferably are identical in configuration as follows: both, that is, the first and/or the second, data acquisition units 130a, 130b are equipped with a communications module 136 having a corresponding antenna unit so that the vehicles 10, 20 can participate in the various forms of vehicle-to-infrastructure communication (V2X). FIG. 1 shows that the vehicle 10 can communicate with the mobile radio base station 210 of a mobile radio provider.

The base station 210 may be an eNodeB base station of an LTE mobile radio provider (Long-Term Evolution) or 5G mobile radio provider (5th generation mobile radio system). The base station 210 and the corresponding equipment is part of a mobile radio communications network having a multiplicity of mobile radio cells, each cell being served by a base station 210.

The base station 210 is typically positioned close to a main road on which the vehicles 10, 20 are driving. The communications module of the data acquisition units 130a, 130b corresponds to an LTE communications module, via which the vehicles 10, 20 can receive mobile data (downlink) and can send such data in the up direction (uplink). They send the data to the base station 210 via what is known as the Uu link. With regard to the LTE mobile radio communications system, the Evolved UMTS Terrestrial Radio Access Network E-UTRAN of LTE consists of a plurality of eNodeBs 210, which provide the E-UTRA user plane (PDCP/RLC/MAC/PHY) and the control plane (RRC). The eNodeBs 210 are interconnected via what is known as the X2 interface. The eNodeBs are also connected to the EPC (Evolved Packet Core) 200 via what is known as the S1 interface. V2X communication is also supported by the 5th generation mobile radio systems, however.

From this general architecture, FIG. 1 shows that the base station 210 is connected via the S1 interface to the EPC 200, and the EPC 200 is connected to the Internet 300. A backend server 320, to which the vehicles 10, 20 can send messages, and from which they can receive messages, is likewise connected to the Internet 300. The backend server 320 may be housed in a computing center of the vehicle manufacturer or of a system provider for the vehicle manufacturer or in a computing center of a public authority, for instance a traffic control station. Finally, a road infrastructure station 310 is also shown. This can be exemplified by what is often known as a "roadside unit" (RSU) 310 in the technical jargon. The road infrastructure station 310 can be connected directly to the Internet 300. Communication between vehicle 10, 20 and road infrastructure station 310 can take place via the WLAN p system or another local wireless network. In order to simplify the implementation, it is assumed that all the components have been assigned an Internet address, typically in the form of an IPv6 address, so that the packets, which carry messages between the components, can be routed accordingly. The various interfaces mentioned are standard. Reference is made in this regard to the relevant published specifications of the mobile radio communication system.

Figure 2:
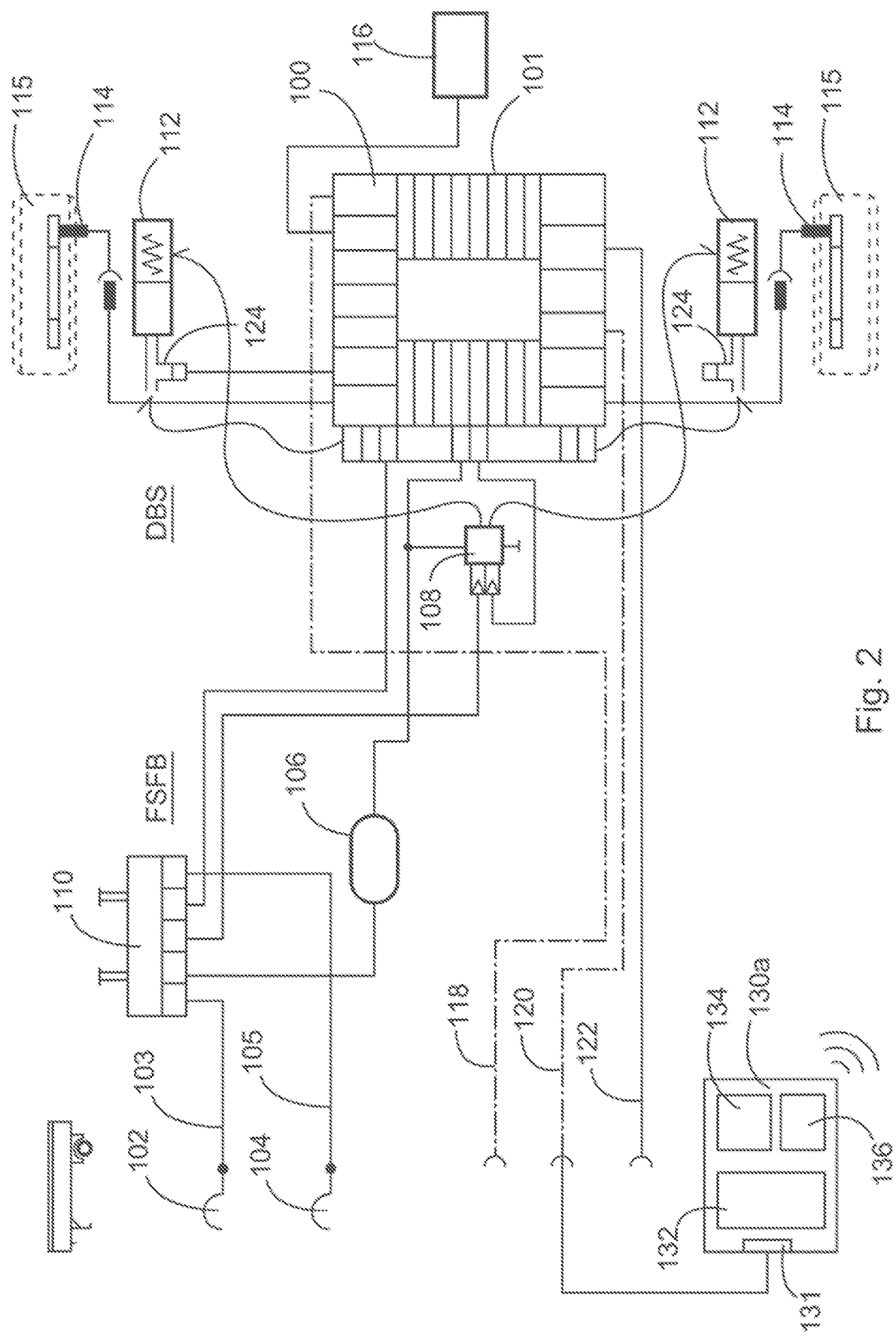
FIG. 2 shows a circuit diagram of the electronic and pneumatic equipment of a trailer vehicle equipped with compressed air braking system.

FIG. 2 shows schematically a block diagram of the on-board electronics and also the pneumatic equipment of the trailer vehicle 20. As mentioned, the trailer vehicle 20 is equipped with a compressed air braking system DBS. FIG. 2 shows the more detailed configuration of the braking architecture of the trailer 20. It shows a trailer having just one axle, which is also known as a semi-trailer. This is only one example of a trailer vehicle 20 equipped with compressed air brakes. As described, however, various other trailer types can be equipped with pneumatic, hydraulic or electrical braking facilities. The reference number 100 denotes an EBS control unit (Electronic Braking System). The EBS control unit 100 is connected to a braking modulator, which modulates the brake pressure in the compressed air brakes at the wheels 115 in order to stop the wheels 115 from locking during the braking process. This can hence prevent the trailer 20 from swinging out. In addition, an inertial measurement unit (IMU) 116 is connected to the EBS control unit 100. This contains a number of accelerometers and, if applicable, yaw-rate sensors to detect the movement of the trailer vehicle 20 for a number of degrees of freedom. The EBS control unit 100 can thereby also perform the ESC function (electronic stability control). This uses selective braking of individual wheels 115 to prevent skidding of the vehicle in the boundary region in curves both during oversteering and during understeering.

Reference number 112 denotes the already mentioned Tristop cylinders, which during normal operation actuate the brake shoes of the wheel brake via a rod, and during decoupled operation actuate the spring-loaded parking brake FSFB according to the specified brake pressure. On the wheels 115 are also mounted wheel speed sensors 114, which are used to detect the rotational speed of the wheels 115. There are two compressed air lines 102, 104, which are connected to the towing vehicle 10. The one line is designated the supply line and is used for supplying compressed air to the trailer 20. The reference number 102 denotes the corresponding connection. The corresponding line is colored for better identification. It is usually colored red. This supply line is taken to the park-release emergency valve 110, and leads from there also to the air reservoir 106 of the trailer 20. From there, the supply line continues to the modulator of the EBS control unit 100 and on to the anti-compounding valve 108. The second compressed air line is designated a braking line and is used to transmit the brake pressure as set by the driver of the towing vehicle 10 by pressing the brake pedal. The reference number 104 denotes the corresponding connection of the brake pressure line to the trailer 20. Again, this line leads via the park-release emergency valve 110 to the anti-compounding valve 108, and from there to the Tristop cylinders 112 and to the modulator of the ESP control unit 100.

In addition, there are electrical connections between the trailer vehicle 20 and the towing vehicle 10. The reference number 118 denotes a diagnostics line. Via this line, a diagnostics unit can be connected, which can be used to read out the error memory of the EBS control unit 100. The reference number 120 denotes a CAN bus line. Control commands are transferred from the towing vehicle 10 to the EBS control unit 100 via this bus line. Finally, the reference number 122 denotes a power supply line. The trailer vehicles 20 are typically not equipped with their own power supply.

The compressed air braking system DBS of the trailer vehicle 20 consists of the components: EBS control unit 100, the connection 102 for the compressed air supply line, the compressed air supply line 103, the connection 104 for the brake pressure line, the brake pressure line 105, the air reservoir 106, the anti-compounding valve 108, the park-release emergency valve 110, the Tristop cylinder 112, and the speed sensor 114.

The spring-loaded parking brake FSFB consists of the components: the connection 102 for the compressed air supply line, the compressed air supply line 103, the air reservoir 106, the anti-compounding valve 108, the park-release emergency valve 110, and the Tristop cylinder 112. In normal operation, the service brake is actuated via the Tristop cylinder 112. The brake pressure applied to the Tristop brake cylinder 112 is measured via the pressure sensor 124. The first data acquisition device of the trailer vehicle 20 is denoted by the reference number 130a. It is connected to the communications bus 120, for example, CAN bus. The first data acquisition device 130a records the time series of the pressure values measured by the pressure sensors 124. For this purpose, these measured values are transmitted together with the acquired measurement time points via the CAN bus 120 to the first data acquisition device 130*a*. In exactly the same way, the wheel speed values measured by the wheel speed sensors 114 are transmitted together with the measurement time points to the data acquisition device 130*a*. FIG. 2 also shows an approximate block diagram of the first data acquisition device 130*a*. Reference number 132 denotes a memory unit. It may be a nonvolatile memory unit in the form of an SD memory card, a USB stick, an SSD hard disk, or an HDD hard disk, et cetera. A CMOS RAM memory unit is also possible here.

The data interchange between towing vehicle 10 and trailer vehicle 20 is specified in the CAN bus standard. For precise details of the transmission protocol, reference is made to specification ISO 11992-2 (high-speed CAN). Data is continuously interchanged via this bus. In the example considered, the towing vehicle 10 sends CAN messages in the form "braking requirement inactive" and "braking requirement active, the deceleration requirement has the value XY". For intercommunication between the control units in the towing vehicle 10 via the CAN bus, the message formats are specified in the SAE J1939 standard. Not all vehicle manufacturers adhere to this, however, and instead often specify their own proprietary message formats. A braking system manufacturer for trailer vehicles must additionally also adhere to the message formats specified in the standard ISO 11992, although the towing vehicle manufacturer is also bound by this standard.

In test drives, the braking behavior of trailer vehicle 20 is now meant to be tested. For this purpose, measured values are recorded in the first data acquisition unit 130*a*, which is connected in the trailer vehicle 20 to the CAN bus 120. Such first and/or second data acquisition units 130*a*, 130*b* are available to buy off the shelf. Various suppliers often refer to them as a data logger or telematics unit. The first data acquisition unit 130*a* receives the messages that are transmitted on the CAN bus 120. As in the example of FIG. 2, it may be the case that the sensors 114, 124 are not connected directly to the CAN bus 120. Nonetheless, the EBS control unit 100 transmits its measured values via the CAN bus 120 to the towing vehicle 10, and therefore they can be acquired by the first data acquisition unit 130*a*.

Figures 3, 4:
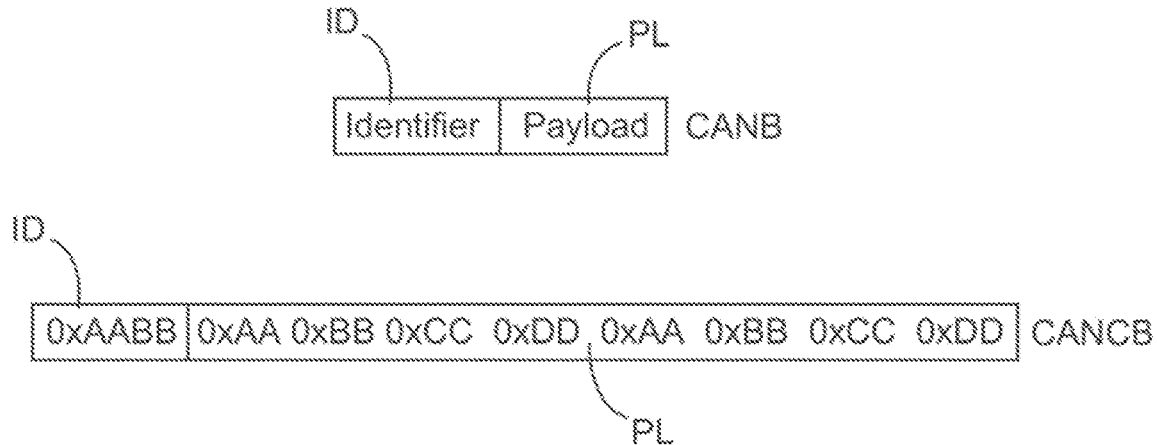
FIG. 3 shows the approximate format of a CAN bus message containing CAN-bus identifier and payload field.
FIG. 4 shows an example of a data series or acquiring the braking behavior of the trailer vehicle.

FIG. 3 shows an approximate message format of the CAN bus messages. There are two parts, with a message identifier ID being transmitted in the first part, and the payload in the second part. The message identifier ID identifies the contents of the data transmitted by the message, and decides the priority of the message in bus arbitration. In the case of the CAN bus, a bus access method based on the CSMA/CR method can be used, which stands for "Carrier Sense Multiple Access/Collision Resolution". The messages used to transmit the sensor data are known to the braking system manufacturer. A fundamental assignment to the message content is hence possible. This is exploited in the first data acquisition unit 130*a*. The messages containing the data of interest can be filtered out via the message identifier. The information part of the message then contains the precise parameter values. This data can be stored in the first data acquisition unit 130*a*. The time information about the measurement time point is typically not transmitted via the CAN bus 120. It is therefore necessary that the first data acquisition unit 130*a* notes down as well from its own clock, and/or identifies by a timestamp, the time points at which the respective messages in the data series arrive.

There is a problem, however, that the manufacturers of the data acquisition units 130*a*, 130*b* know neither the identifiers ID nor the instructions and/or calculation rules for message interpretation, which may differ from manufacturer to manufacturer. Thus the manufacturers of the data acquisition units 130*a*, 130*b* cannot easily hard-program data acquisition units 130*a*, 130*b*. This is why the disclosure proposes a programmable data acquisition unit 130*a*, 130*b*. As mentioned, the first and second data acquisition units can be operated independently of one another and be identical in configuration. It is explained below how the first and second data acquisition units 130*a* and 130*b* can be configured. Reference is made only to the first data acquisition unit 130*a* by way of example. A configuration message CANCB is transmitted to the data acquisition unit 130*a*. This can preferably be performed via the air interface, that is, via the communications module 136. The configuration message CANCB would be generated by the experts, who are also interested in the test results and, for instance, are located in the same place as the backend server 320, and would likewise be transmitted via mobile radio or WLAN p to the trailer vehicle 20. As an example, a configuration message could be transmitted to the trailer vehicle 20 in the JSON format or XML format. This message would contain in the payload part the desired message identifiers (ID) that are meant to be acquired and also the instructions for interpreting the payload in the desired CAN message CANB for the preliminary analysis, as well as the rules for when the data is meant to be collected. This can be performed in a time-based or event-based manner. The configuration message CANCB thus defines what data is used to compile the data series (DR).

An instruction for interpreting the payload data could read, for example: "take the first character of messages having identifier XY, multiply it by a scaling factor, add an offset, and interpret as an integer". This instruction would be followed for interpreting the payload in the received message, and the corresponding measured values would be entered in the data series. Another example of interpretation instructions at the bit level is: "For messages having ID=0xAABB, take byte 1 and evaluate bit 2".

At the byte level: "For messages having ID=0xAABB, determine the value of bytes 1 and 2, convert it using a scaling factor, and add an offset in order to obtain physical value for interpretation." This corresponds to an instruction for how integers can be converted into floating point numbers. It is also possible to define the significance of the bits/bytes. There are two possible options here of sorting from right to left ("little endian") corresponding to the least significant byte first, and sorting from left to right ("big endian") corresponding to the most significant byte first. The type of number notation, for instance integer or floating point number, can also be part of the instruction.

FIG. 4 shows a specific numerical example of a measurement series for the operating pressure, measured by the pressure sensor 124. Twelve measured values are listed. The first column contains the serial number DR1 of the measured values. The date and the measurement time point DR2 of each measured value is given in the second column. A brake status DR3 is given in the third column. The number 1 means that the service brake is in normal operation. The fourth column contains the circumferential speed DR4 of a wheel, measured at the same time for each time point in the units m/s. The fifth column lists the brake pressure DR5, measured in bar. The sixth column lists the relative change in brake pressure DR6 compared with the previous measured value. This figure is dimensionless and is calculated according to a calculation instruction, which is explained in greater detail below. Finally, the last column lists a label DR7, which is linked to the values in the fifth column and indicates whether the change in measured value lies below a minimum value. This information is used to find the region of interest of constant brake pressure DR5 more quickly.

Figure 5:
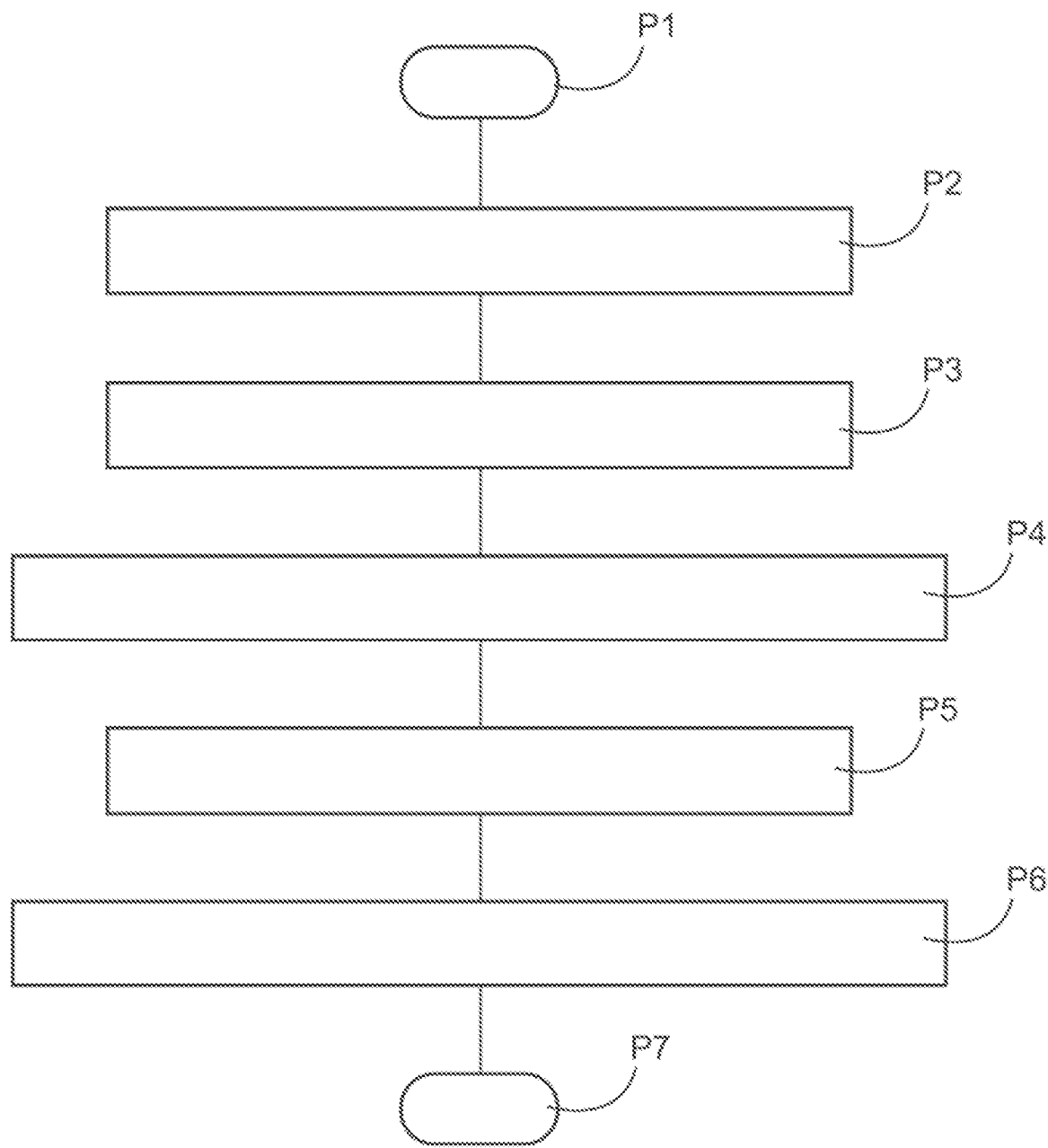
FIG. 5 shows a flow diagram for a computer program that can be used to implement pre-processing according to the disclosure of the data series.

The numbers of the table that are contained in the sixth and last columns are calculated by a preliminary analysis of the measured values in the fourth and fifth columns. This is done using a computer program, the flow diagram for which is shown in FIG. 5 and which is computed in the processing unit 134 of the first data acquisition device 130a. The computer program of FIG. 5 can be run through at the end of the test drive or else executed in the background already during the test drive. The program start is denoted by the reference sign P1 and the statement "Start". In program step P2, specified by "Calculate relative change in measured values", the relative change in the recorded measured values for the brake pressure is calculated. The resultant values are listed in the column RBDAE of the table in FIG. 3. The change in the pressure value relative to the preceding value is determined and entered in the column RBDAE in program step P2. The calculation instruction consists in forming the ratio between subsequent value and preceding value and subtracting the value 1 from the result. The relative change between the values in rows 3 and 4 of column five would be calculated as follows: 4.3/3.4−1=0.2647. The numerical values in column RBDAE are obtained in this way. In the next program step P3, specified by "Def. label:="True" for rel. change<=RFW", the values are analyzed with regard to the relative change, and an entry made in the column "Label" of the table in FIG. 3. The entry indicates whether the relative change is relatively low. If yes, the entry "True" is entered as the label. If the relative change compared with the preceding value is larger, "False" is entered as the label. The region of interest of relatively constant brake pressure can then be found more quickly by virtue of this step. As an example, a value of +/−10% is stipulated as the limit value for the maximum permitted relative change. If this limit value is applied to the values in column RBDAE in the table of FIG. 3, then the entry "True" is set first in row 4 and last in row 10. In program step P4, specified by "Count number of "True" entries per region where wheel speed≠0", a preliminary analysis of the recorded data series DR is now performed. This can be performed quite simply by considering the entries in the Label column. The number of "True" entries per "True" region is counted where the measured circumferential speed does not equal zero. There may be several of such regions in the recorded data series. The test engineers are interested in the longest, constant pressure characteristic during a braking process and in the deceleration of the vehicle in this region. This region corresponds to the region containing the maximum number of "True" entries in the table where the circumferential speed does not equal zero. The data for the region determined in step P4 is selected in program step P5, specified by "Select the maximum region", and combined as the payload packet for the transmission to the backend server 320. In program step P6, specified by "Transmit the selected maximum region to backend", the prepared payload packet is transferred to the communications module 136. In the communications module 136, the necessary protocol data such as error protection and address information, et cetera, is added to the payload packet, which is then transmitted to the backend server. The program ends after the transfer of the payload packet to the communications module 136 in the program step P7, specified by "End".

Figure 6:
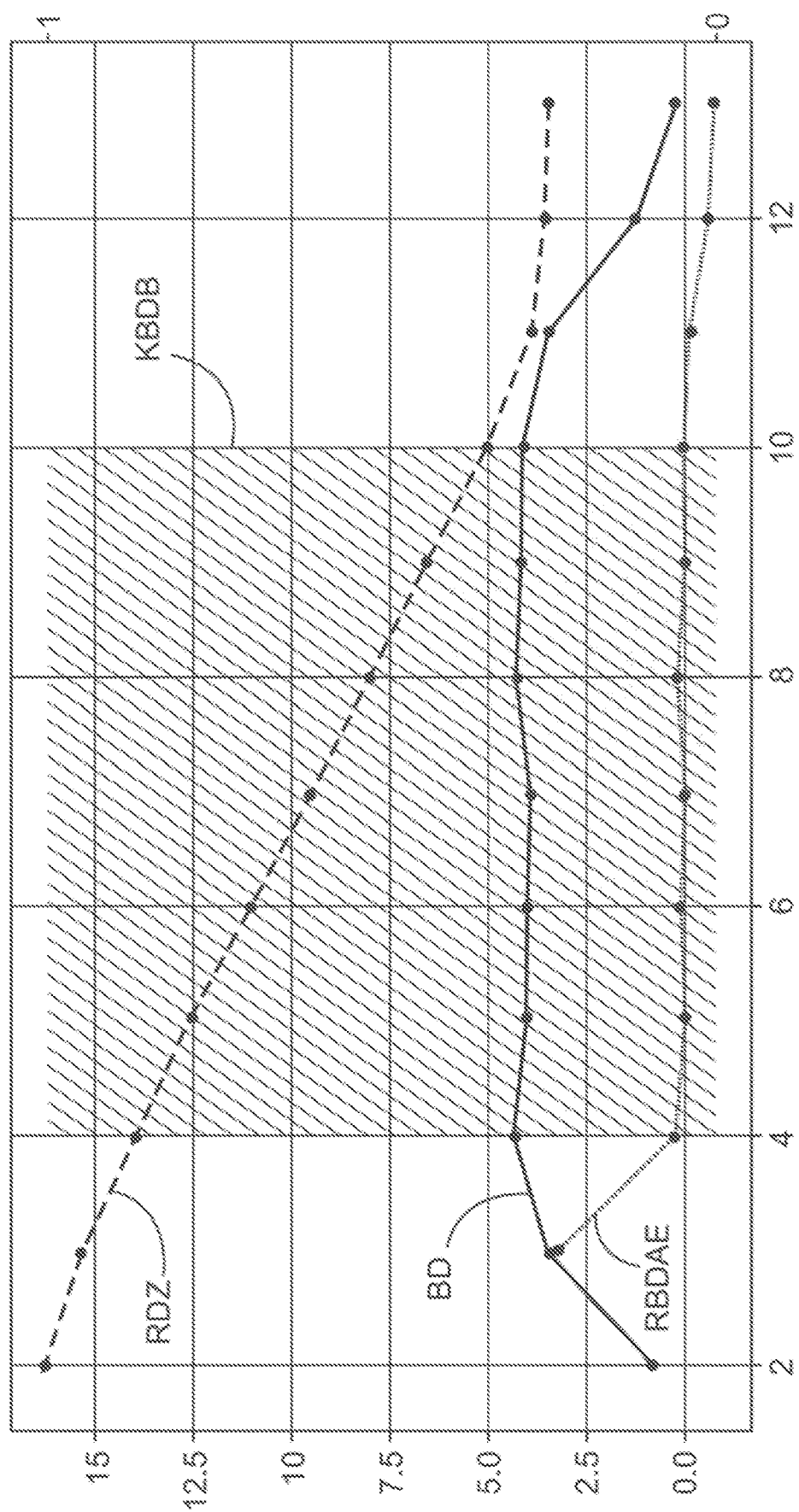
FIG. 6 shows a measured-value graph for the data series of FIG. 4, including depiction of the region of interest of constant brake pressure during a braking process; and, FIG. 7 shows another measured-value graph for another measured-value series, including depiction of the region of interest of constant brake pressure during a braking process.

FIG. 6 shows the measured value series in the table of FIG. 3 in graphical form. The reference sign BD denotes the curve for the measured brake pressure DR5. The reference sign RBDAE denotes the calculated relative change DR6 in the brake pressure DR5. The reference sign RDZ denotes the circumferential speed of the measured wheel 115. Finally, KBDB denotes the region of interest of relatively constant brake pressure DR5 for the linear deceleration, where the relative change DR6 in the brake pressure equals +/−10% of the previously measured brake pressure value DR5. The measured values in this region are labeled with the entry "True". In the example of FIG. 6, selecting the region to be extracted is particularly easy because in total there is only one region containing entries set to "True".

Figure 7:
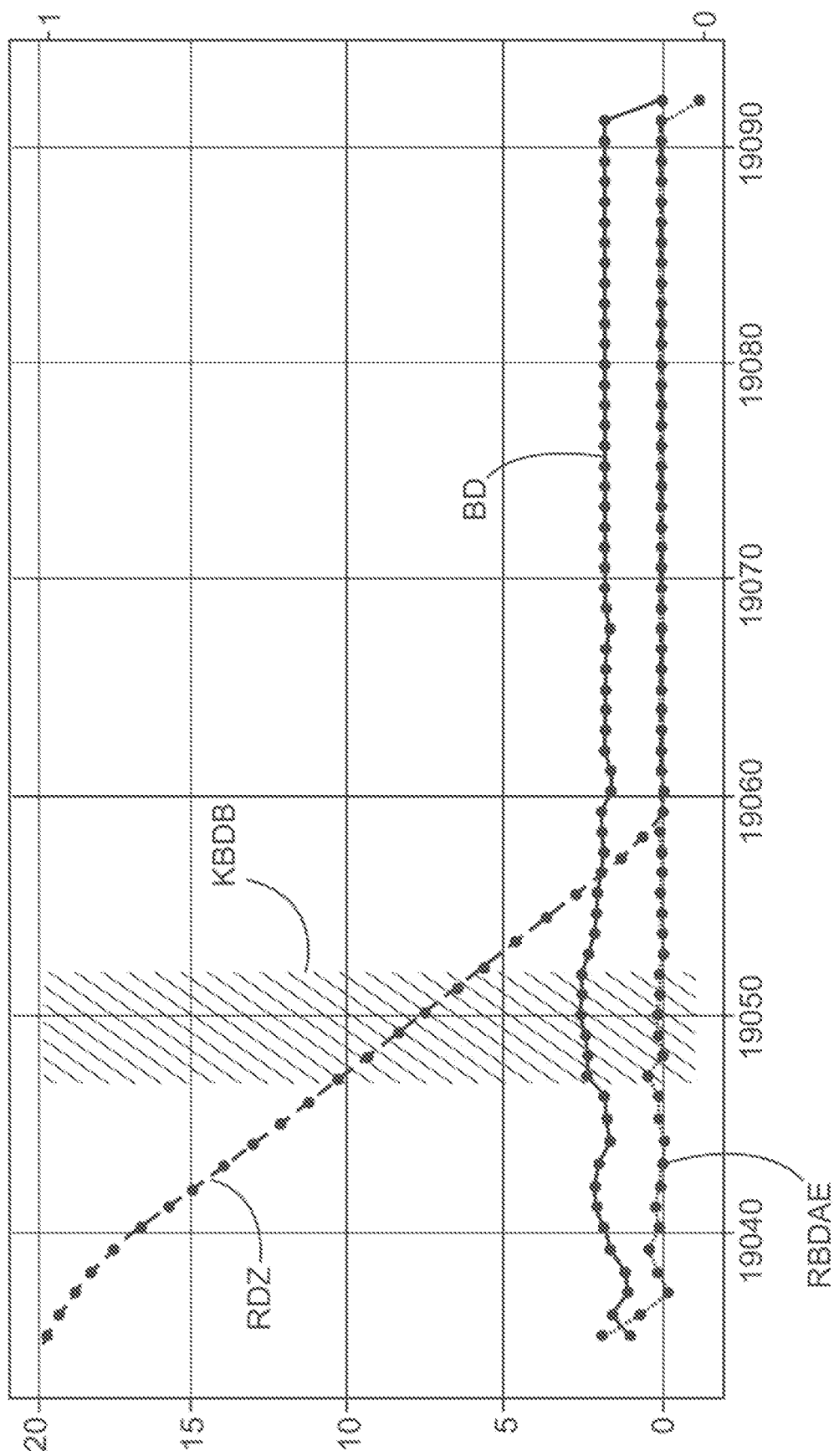

FIG. 7 shows the graphical representation of a data series DR in which there are a plurality of regions of constant brake pressure DR5. In this case, the region of longest duration while the vehicle 20 is moving is selected. The stationary region might include a region in which the wheels 115 lock during the braking process, and therefore this region might also be of interest for another objective. It can be seen clearly especially in FIG. 7 that the region KBDB corresponds to only about 10% of the volume of data compared with the entire data series DR. The advantage of this type of preprocessing is that far less data has to be transmitted to the backend server 320, and far less data has to be stored and evaluated in the backend. In real test drives, the advantage might be even greater, for instance because just 1% of the data must be transmitted.

All examples mentioned herein, as well as the necessary wording, shall be interpreted without restriction to such specifically stated examples. Thus, for example, a person skilled in the art will appreciate that the block diagram shown herein represents a conceptual view of a circuit arrangement. Similarly, it is evident that a depicted flow diagram, state transition diagram, pseudocode, and the like constitute different variants for representing processes that can be stored essentially in computer-readable media and thus executed by a computer or processor. The object mentioned in the claims can explicitly also be a person.

It should be understood that the proposed method and the associated devices can be implemented in various forms of hardware, software, firmware, special processors or a combination thereof. Special processors may include application-specific integrated circuits (ASICs), Reduced Instruction Set Computers (RISC), and/or Field Programmable Gate Arrays (FPGAs). Preferably, the proposed method and the device are implemented as a combination of hardware and software. The software is preferably installed as an application program on a program storage device. Typically, this is a machine based on a computer platform that has hardware such as one or more central processing units (CPUs), a direct access memory (RAM), and one or more input/output (I/O) interface(s). An operating system is also typically installed on the computer platform. The various processes and functions described herein can be part of the application program or a part that runs via the operating system.

The disclosure is not restricted to the embodiments described here. There is room for various adjustments and modifications that a person skilled in the art would consider based on his knowledge and in association with the disclosure.

The aggregation function presented herein is based on the assumption that a data series can be reduced to a characteristic region and yet a technical assessment of the system status is possible; in this case, pressure characteristic and deceleration. However, the presented principle for data aggregation can be generalized and applied to different types of other uses and data series.

Further examples of control units in vehicles that can also be tested or monitored by the data acquisition unit according to the disclosure are: airbag control unit, engine control unit, transmission control unit, chassis control unit, and also various control units for assistance systems: emergency brake assistant, Electronic Stability Control (ESC), lane keeping or lane change assistant, turn assistant, distance control assistant, distance warning assistant, parking assistant, et cetera. The surround sensors (lidar, radar, ultrasound, and various types of cameras) needed for these can hence also be evaluated dynamically. Filtering the output data is advantageous especially in the case of these sensors, because the data volumes are much larger here than for the various control units. In the case of the surround sensors, the data aggregation can be based on, for example, an externally installed roadside unit 310 sending, for the purpose of dynamic message interpretation, to the data acquisition system a message containing the command as to when the images captured by the camera are meant to be sent to the backend server 320. This roadside unit 310 could send this message when the test vehicle is at a certain distance from the traffic sign.

The data acquisition unit according to the disclosure can be used in particular for test drives in the development of vehicle systems. It is also possible, however, that such data acquisition units are used in series-produced vehicles to monitor the data bus traffic within the vehicle and to detect manipulations or error states.

It would be possible, for instance, to capture images of gas station prices in an automated manner in a usage outside test tracks. The navigation system would still have to send the appropriate command as to when the data is meant to be transferred to the backend server 320. Another example relates to fleet controlling, for example for logistics companies. The controllers could then themselves use the dynamic message interpretation to define data packets that are important for the reporting. For example, a message might read: "How often did the lane keeping assistant intervene to prevent unwanted lane changes?" This data could be transmitted from time to time to the backend server 320.

It is understood that the foregoing description is that of the preferred embodiments of the invention and that various changes and modifications may be made thereto without departing from the spirit and scope of the invention as defined in the appended claims.

LIST OF REFERENCES (PART OF THE DESCRIPTION)

10 towing vehicle
20 trailer vehicle
100 brake control unit
102 connection for compressed air supply line
103 compressed air supply line
104 connection for brake pressure line
105 brake pressure line
106 air reservoir
108 anti-compounding valve
110 park-release emergency valve
112 Tristop brake cylinder
114 wheel speed sensor
115 wheel
116 IMU
118 diagnostics line
120 communications bus
122 power supply line
124 pressure sensor
130a first data acquisition unit
130b second data acquisition unit
131 CAN bus interface
132 memory unit
134 processing unit
136 communications module
200 Evolved Packet Core
210 mobile radio base station
300 Internet
310 roadside unit
320 backend server
BD brake pressure characteristic
CANB CAN message
CANCB configuration message
DBS compressed air braking system composed of components 100-114
DR1 serial number
DR2 measurement time point
DR3 brake status
DR4 circumferential speed
DR5 brake pressure
DR6 relative change in brake pressure
DR7 label
FSFB spring-loaded parking brake composed of components 102, 103, 106, 108, 110, 112
ID message identifier
KBDB region of constant brake pressure
PL payload
RBDAE characteristic of relative change in brake pressure
RDZ wheel speed characteristic
RFW reference value
P1-P7 various program steps of a computer program

KEY TO FIGURES

FIG. 4
Nr. No.
Mess-Zeitpunkt Measurement time point
B Status B status
BD/bar BP/bar
RBDAE RBDAE
Marke Label
KBDB KBDB

What is claimed is:

1. A data acquisition device for a mobile device, the data acquisition device comprising:
a processing unit;
a memory unit;
a communications module configured to send acquired data to a backend server;
a bus interface configured to receive messages (CANB) transmitted via an internal communications bus of the mobile device;
said processing unit being configured to form a data series (DR) on a basis of data received in the messages (CANB) and to store said data series (DR) in said memory unit;
said processing unit being configured to conduct, in the form of data aggregation, a preliminary analysis of said data series (DR) stored in said memory unit, wherein at least one region of interest (KBDB) of said data series (DR) is extracted and transferred to said communications module in said preliminary analysis; and,
said communications module being configured to transmit the at least one region of interest (KBDB) of said data series (DR) to the backend server.

2. The data acquisition device of claim 1, wherein said processing unit is configured to note down in said data series (DR), with the data in each received message (CANB), the time point at which each of the received messages (CANB) is received.

3. The data acquisition device of claim 1, wherein said communications module is configured to receive at least one configuration message (CANCB), wherein the at least one configuration message (CANCB) includes an instruction as to how the data in the message (CANB) transmitted via the internal communications bus is to be evaluated.

4. The data acquisition device of claim 3, wherein said processing unit is configured to compile said data series (DR) using the data from the received messages (CANB) in accordance with the instruction from the at least one configuration message (CANCB).

5. The data acquisition device of claim 1, wherein the data relates to data measured by sensors or data calculated by processing devices.

6. The data acquisition device of claim 1, wherein the mobile device is a vehicle, and the internal communications bus is a CAN bus of the vehicle.

7. The data acquisition device of claim 6, wherein the vehicle is a towing vehicle or a trailer vehicle; and, the trailer vehicle is equipped with a braking system.

8. The data acquisition device of claim 7, wherein the internal CAN bus is of the trailer vehicle; and, connected to the internal CAN bus of the trailer vehicle is a brake control unit, which transmits via the CAN bus the data from a plurality of at least one of brake pressure sensors and wheel speed sensors connected to the brake control unit.

9. The data acquisition device of claim 8, wherein said communications module is configured to receive at least one configuration message (CANCB), wherein the at least one configuration message (CANCB) includes an instruction as to how the data in the message (CANB) transmitted via the internal communications bus is to be evaluated; the instruction in the at least one configuration message (CANCB) includes at least a message identifier (ID) of the CAN message (CANB), wherein the CAN message is transmitted with at least one of a measured brake pressure from one of the plurality of brake pressure sensors and an indication for a minimum relative change in brake pressure which, compared with an immediately preceding brake pressure value in said data series (DR), can still be tolerated for it still to be possible to assign the brake pressure value to a region of relatively constant brake pressure.

10. The data acquisition device of claim 9, wherein the instruction in the at least one configuration message (CANCB) includes at least the message identifier (ID) of the CAN message (CANB) used to transmit the information from a wheel speed sensor.

11. A method for conducting a preliminary analysis in a data acquisition device having a processing unit, a memory unit, a communications module configured to send acquired data to a backend server, and, a bus interface configured to receive messages (CANB) transmitted via an internal communications bus of a mobile device, the method comprising:
    forming, via the processing unit, a data series (DR) on a basis of data received in the messages (CANB) and storing the data series (DR) in the memory unit;
    conducting, via the processing unit, in a form of data aggregation, a preliminary analysis of the data series (DR) stored in the memory unit, wherein at least one region of interest (KBDB) of said data series (DR) is extracted and transferred to said communications module in said preliminary analysis;
    transmitting the at least one region of interest (KBDB) of the data series (DR) to the backend server via the communications module; and,
    wherein the preliminary analysis fulfils the function of the data aggregation.

12. The method of claim 11, wherein the data aggregation includes a step of calculating a relative change in the data in the data series (DR), and a step of assigning a label to a datum in the data series, wherein the label is assigned to the particular datum if the relative change in the nth datum in the data series (DR) compared with the (n−1)th datum in the data series (DR) containing n elements of a natural number, is less than a minimum permitted reference value.

13. The method of claim 12, wherein the data aggregation includes a step of counting immediately successive labeled data in the data series (DR), for which data the mobile device is simultaneously still in motion.

14. The method of claim 13, wherein the data aggregation includes a step of determining in the data series (DR) the region (KBDB) that contains a maximum number of immediately successive data having a set label.

15. The method of claim 14, wherein the region (KBDB) of the data series (DR) including the maximum number of immediately successive data having the set label is sent to the backend server.

16. A vehicle comprising:
    a data acquisition device for a mobile device;
    said data acquisition device having a processing unit, a memory unit, a communications module configured to send acquired data to a backend server, and a bus interface configured to receive messages (CANB) transmitted via an internal communications bus of the mobile device;
    said processing unit being configured to form a data series (DR) on a basis of data received in the messages (CANB) and to store said data series (DR) in said memory unit;
    said processing unit being configured to conduct, in the form of data aggregation, a preliminary analysis of said data series (DR) stored in said memory unit, wherein at least one region of interest (KBDB) of said data series (DR) is extracted and transferred to said communications module in said preliminary analysis; and,
    said communications module being configured to transmit the at least one region of interest (KBDB) of said data series (DR) to the backend server.

17. A vehicle comprising:
    a data acquisition device for a mobile device;
    said data acquisition device having a processing unit, a memory unit, a communications module configured to send acquired data to a backend server, and a bus interface configured to receive messages (CANB) transmitted via an internal communications bus of the mobile device;
    said processing unit being configured to form a data series (DR) on a basis of data received in the messages (CANB) and to store said data series (DR) in said memory unit;
    said processing unit being configured to conduct, in the form of data aggregation, a preliminary analysis of said data series (DR) stored in said memory unit, wherein at least one region of interest (KBDB) of said data series (DR) is extracted and transferred to said communications module in said preliminary analysis;
    said communications module being configured to transmit the at least one region of interest (KBDB) of said data series (DR) to the backend server; and, said data acquisition device being configured to execute the method of claim 11.

18. A preliminary analysis module of a data acquisition device having a processing unit, a memory unit, a communications module configured to send acquired data to a backend server, and, a bus interface configured to receive messages (CANB) transmitted via an internal communications bus of a mobile device, the preliminary analysis module comprising:
- a non-transitory computer readable storage medium having program code stored therein;
- said program code being configured, when executed by a processor, to:
- form, via the processing unit, a data series (DR) on a basis of data received in the messages (CANB) and store the data series (DR) in the memory unit;
- conduct, via the processing unit, in a form of data aggregation, a preliminary analysis of the data series (DR) stored in the memory unit, wherein at least one region of interest (KBDB) of said data series (DR) is extracted and transferred to said communications module in said preliminary analysis;
- transmit the at least one region of interest (KBDB) of the data series (DR) to the backend server via the communications module; and,
- wherein the preliminary analysis fulfils the function of the data aggregation.

\* \* \* \* \*

UNITED STATES PATENT AND TRADEMARK OFFICE
CERTIFICATE OF CORRECTION

| | |
|---|---|
| PATENT NO. | : 12,231,516 B2 |
| APPLICATION NO. | : 17/935715 |
| DATED | : February 18, 2025 |
| INVENTOR(S) | : Christoph König |

Page 1 of 1

It is certified that error appears in the above-identified patent and that said Letters Patent is hereby corrected as shown below:

In the Specification

In Column 1:
Line 46: delete "20121053778" and insert -- 2012/053778 --

In Column 5:
Line 9: delete "or" and insert -- for --

Signed and Sealed this
Twenty-fourth Day of June, 2025

Coke Morgan Stewart
*Acting Director of the United States Patent and Trademark Office*